US009272275B2

(12) United States Patent
Holmes et al.

(10) Patent No.: US 9,272,275 B2
(45) Date of Patent: Mar. 1, 2016

(54) METHOD AND SYSTEM FOR THE SELECTIVE OXIDATIVE DECARBOXYLATION OF FATTY ACIDS

(75) Inventors: Bryan J. Holmes, Burlington, VT (US); Alexander Wurthmann, Burlington, VT (US)

(73) Assignee: University of Vermont and State Agricultural College, Burlington, VT (US)

(*) Notice: Subject to any disclaimer, the term of this patent is extended or adjusted under 35 U.S.C. 154(b) by 15 days.

(21) Appl. No.: 13/503,802

(22) PCT Filed: Oct. 25, 2010

(86) PCT No.: PCT/US2010/053958
§ 371 (c)(1),
(2), (4) Date: Apr. 24, 2012

(87) PCT Pub. No.: WO2011/056508
PCT Pub. Date: May 12, 2011

(65) Prior Publication Data
US 2012/0209049 A1      Aug. 16, 2012

(51) Int. Cl.
*C10G 3/00*     (2006.01)
*B01J 35/00*    (2006.01)
*B01J 27/053*   (2006.01)
*C11C 3/00*     (2006.01)

(52) U.S. Cl.
CPC ............. *B01J 35/004* (2013.01); *B01J 27/053* (2013.01); *C10G 3/42* (2013.01); *C11C 3/00* (2013.01); *C10G 2300/1011* (2013.01)

(58) Field of Classification Search
USPC ....................................................... 585/240
See application file for complete search history.

(56) References Cited

U.S. PATENT DOCUMENTS 4,262,157 A *  4/1981  Hori et al. ............... 558/467

FOREIGN PATENT DOCUMENTS

| JP | 10277568 | 10/1998 |
|---|---|---|
| JP | 2005048098 | 2/2005 |
| KR | 1020050090663 | 9/2005 |
| KR | 100856676 | 9/2008 |
| KR | 100856676 B1 * | 9/2008 |
| WO | 03068324 | 8/2003 |
| WO | 2011056508 | 5/2011 |

OTHER PUBLICATIONS

English Translation of KR100856676B1 from machine translation.*
Black & Veatch Corporation, White's Handbook of Chlorination and Alternative Disinfectants, 2010, Wiley, Fifth Edition, Chapter 18.*
Duke, M., Zhao, D., and Semiat, R., Functional Nanostructured Materials and Membranes for Water Treatment, Advanced Oxidation Processes, 2013, Wiley.*

(Continued)

*Primary Examiner* — In Suk Bullock
*Assistant Examiner* — Philip Louie
(74) *Attorney, Agent, or Firm* — Hodgson Russ, LLP

(57) ABSTRACT

Selective, radically initiated oxidative decarboxylation may produce low viscosity renewable fuels from biologically derived fats and oils. Fatty acids and triglycerides may be decarboxylated using oxidants at a water/oil interface. The oxidants may be produced using photo-Fenton reagents. The reaction advantageously can be carried out at room temperature and pressure and has fewer unwanted byproducts than traditional decarboxylation techniques.

32 Claims, 2 Drawing Sheets

(56) References Cited

OTHER PUBLICATIONS

Liochev, Metal Ions in Biological Systems, Bekker, 1999, p. 3-6.*
Munter, R., Advanced Oxidation Processes—Current Status and Prospects, Proc. Estonian Acad. Sci. Chem., 2001, 50, 2, 59-50.*
"Ambient Temperature", Dictionary of Materials and Testing, Second Edition, Society of Automotive Engineers, Inc., p. 19.*
Extended European Search Report dated Aug. 14, 2013, in related EU Patent Application No. 10828827.5.
"In-Situ Chemical Oxidation," by Scott G. Huling et al. USA Environmental Protection Agency, pp. 1-58, Dec. 31, 2006.
"Lipid Oxidation," by E.N. Frankel. Prog. Lipid Res., vol. 19, pp. 1-22, Dec. 31, 1980.
International Search Report and Written Opinion dated May 25, 2011, in related International Application No. PCT/US2010/053958.

* cited by examiner

METHOD AND SYSTEM FOR THE SELECTIVE OXIDATIVE DECARBOXYLATION OF FATTY ACIDS

RELATED APPLICATION DATA

This application claims the benefit of priority of U.S. Provisional Patent Application Ser. No. 61/255,515, filed Oct. 28, 2009, and titled OXIDATIVE DECARBOXYLATION OF FATTY ACID AND TRIGLYCERIDES, which is incorporated by reference herein in its entirety.

FIELD OF THE INVENTION

The present invention is directed to a method and system for the selective oxidative decarboxylation of fatty acids.

BACKGROUND

Biologically derived fuels, such as triglycerides and methyl ester fatty acids are commonly used in diesel engines as a renewable hydrocarbon fuel. Unfortunately, these biologically derived fuels have certain physiochemical properties that make them unsuitable for use in cold weather. Biodiesel, a renewable fuel composed of mono-alkyl esters of long chain fatty acids, has the advantages of lower cloud- and gel-points compared to vegetable derived oils, but still experiences gelling in cold weather. Notably, even with an anti-gelling agent, the viscosity of biodiesel is too high for use in aviation and spark ignition engines.

Biodiesel is typically produced from oils or fats using transesterification or acid esterification. The transesterification process reacts an alcohol (e.g., methanol) with the triglyceride oils contained in vegetable oils, animal fats, or recycled greases, forming mono-alkyl esters of long chain fatty acids (biodiesel) and glycerin (soap). The reaction requires heat and a strong base catalyst, such as sodium hydroxide or potassium hydroxide. Some feedstocks must be pretreated before undergoing transesterification. For example, feedstocks with more than 4% free fatty acids, which include inedible animal fats and recycled greases, will typically be pretreated in an acid esterification process to lower the weight percent of free fatty acids. In the pretreatment process, the feedstock is reacted with an alcohol, such as methanol, in the presence of a strong acid catalyst, such as sulfuric acid, which converts the free fatty acids into biodiesel.

There are processes that use pyrolysis and catalysts to improve the physiochemical properties of mono-alkyl esters; however, these processes typically result in many undesirable byproducts.

SUMMARY OF THE DISCLOSURE

In a first aspect, the present invention is directed to a method of decarboxylating a fatty acid comprising: providing a fatty acid at a water/oil interface; generating a water soluble oxidant capable of decarboxylating the fatty acid at the water/oil interface; and contacting the oxidant with the fatty acid at the water/oil interface to produce a decarboxylated product.

In another aspect, the present invention is directed to a method of decarboxylating a fatty acid feedstock comprising: providing a fatty acid having a carboxyl group; generating oxidants in aqueous solution; mixing the oxidants with the fatty acid stock; forming a water/oil interface between the oxidants and the fatty acid feedstock; and contacting the oxidants with the carboxyl group portion at the water/oil interface to decouple the carboxyl group portion from the fatty acid feedstock, wherein the orientation of the carboxyl group portion at the water/oil interface prevents contact between the oxidants and a non-carboxyl group portion of fatty acid feedstock.

In yet another aspect, the present invention is directed to a photo-Fenton reaction system for the selective decarboxylation of a fatty acid feedstock comprising: a light source; and a mixture of an aqueous solution of hydrogen peroxide, a Fenton metal catalyst, an pH-modifying substance in an amount sufficient to adjust the pH to a value of from between about 3 to about 6, and the fatty acid feedstock, wherein the mixture is passed in proximity to the light source, and wherein the mixture provides a water/oil interface, the water/oil interface providing a plurality of contact sites for the decarboxylation of the fatty acid feedstock.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Producing low viscosity renewable fuels from biologically derived fats and oils may be accomplished by the process of selective oxidative decarboxylation of fatty acid and/or triglyceride feedstocks. At a high level, an embodiment of the present disclosure decarboxylates fatty acids and triglycerides, with reagents and/or physical promoters, using oxidants at a water/oil interface. In one exemplary aspect, the decarboxylated product from such a reaction has a lower viscosity than biodiesel or its parent triglyceride. In certain embodiments, the reaction advantageously can be carried out at room temperature and pressure and has fewer unwanted byproducts than other decarboxylation techniques, such as hydrocracking.

Figure 1:
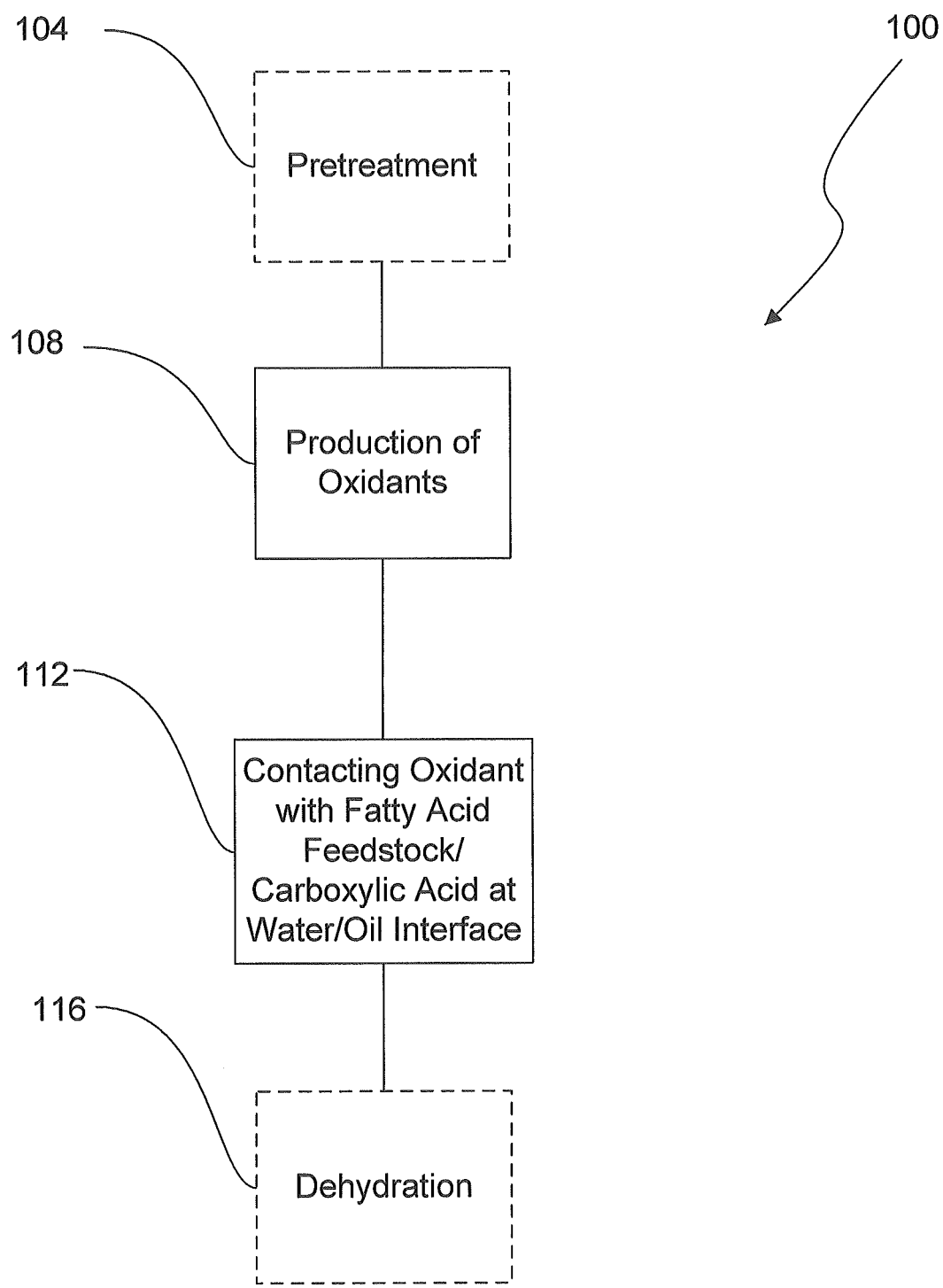
FIG. 1 is a block diagram of an exemplary embodiment of oxidative decarboxylation of triglycerides and free fatty acids, according to an embodiment of the current invention.

FIG. 1 illustrates an exemplary process 100 for selective oxidative decarboxylation of fatty acids. As many types of vegetable and animal fats may be used as a feedstock and some of these feedstocks may have been previously used, in other processes such as cooking oils or recycled greases, pretreatment of the feedstocks may be required at optional step 104. Step 104 may include various pretreatment processes such as, but not limited to, straining, filtering, and/or dehydrating, or combinations thereof, by which unwanted constituents can be removed from the feedstock. Step 104 may also include chemical separation or decomposition of feedstock molecules. For example, if the feedstock includes triglycerides, the triglycerides may be modified so as to separate it into its constituent fatty acid portions. The decomposition of triglycerides is typically performed using hydrolysis, but other processes known in the art may be used to form carboxylic/fatty acids from the triglyceride molecules. If hydrolysis is used, the reaction can proceed according to Reaction 1 shown below:

{Reaction 1}

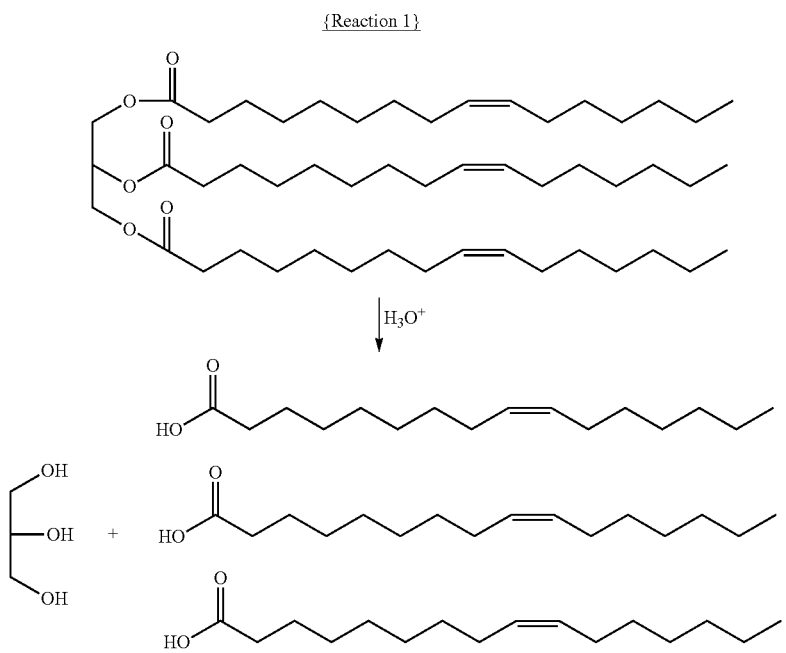

Step 104 may be omitted depending on the quality and composition of the feedstock. For example, if the feedstock is primarily free fatty acids with very few impurities, a pretreatment process may not be needed.

At step 108, one or more oxidants are produced. Examples of oxidants include, but are not limited to, hydroperoxide radicals, superoxide radicals, peroxide radicals, hydroxyl radicals, or iron (IV) oxide, and any combinations thereof. In one example an oxidant may be produced under photo-Fenton conditions. An example photo-Fenton environment includes at least a Fenton metal catalyst, hydrogen peroxide ($H_2O_2$), water, and a light source.

A Fenton metal catalyst (Fe (II) in Reaction 2 below) may be a metal, or combination of metals, from the fourth period transition metals. Example Fenton metal catalysts include, but are not limited to, one or more of Iron (Fe), Copper (Cu), Vanadium (V), Manganese (Mn), Titanium (Ti), and any combinations thereof. In an exemplary embodiment, and as shown in Reaction 2, the Fenton metal catalyst is Fe(II).

A possible reaction for the production of hydroxyl radicals, .OH, is shown in Reaction 2 below:

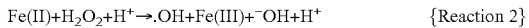  {Reaction 2}

In Reaction 2, ferrous iron (Fe(II)) is reacted with $H_2O_2$ and hydronium ($H_3O^+$) to form .OH, ferric iron (Fe(III)), hydroxide ($^-OH$) and $H^+$. Reaction 2 can be conducted at experimental conditions such as, but not limited to, room temperature, atmospheric pressure, and using a light source that provides visible, UVA, UVB, and UVC wavelengths, or any combination thereof.

The concentration of the Fenton metal catalyst used in the photo-Fenton reaction is sufficient to provide a near continuous supply of contacting sites when in the presence of hydrogen peroxide, but not so much that the oxidants, such as the hydroxyl radical, appreciably reacts with the Fenton metal catalyst cation, such as the ferric iron shown in Reaction 2. In one example, the concentration of Fenton metal catalyst is from about $1 \times 10^{-6}$ wt % to about 1 wt %. In another example, the concentration of Fenton metal catalyst is about $8 \times 10^{-3}$ wt % to about $4.6 \times 10^{-4}$ wt %. In yet another example, the concentration of Fenton metal catalyst is about $4 \times 10^{-4}$ wt %. In an alternate embodiment, a Fenton metal catalyst may not be required. In one such example, a light source may be used to generate oxidants from hydrogen peroxide.

Hydrogen peroxide is also used in the photo-Fenton process and is present in concentrations that allow for adequate oxidant generation in the presence of the Fenton metal catalyst. In one example, the concentration of hydrogen peroxide is from about $1 \times 10^{-6}$ wt % to about 5 wt %. In another example, the concentration of hydrogen peroxide is about $8 \times 10^{-4}$ wt % to about 1.5 wt %. In yet another example, the concentration of hydrogen peroxide is about 1 wt %.

The reaction mixture, i.e., the Fenton metal catalyst and hydrogen peroxide, may then be irradiated with a light source to improve the reaction kinetics. Example light sources for use in the photo-Fenton reaction include, but are not limited to, a solar light source, a high or medium pressure mercury lamps (e.g., contained in a water-cooled quartz cell or similar cooling device), a polychromatic Xe lamp, an ultraviolet light emitting diode, an ultraviolet fluorescent lamp, an ultraviolet laser, a light source capable of improving the reaction kinetics of the photo-Fenton reaction, and any combination thereof. In one example, the light source is capable of producing some light emissions in the range of about 100 nm to about 800 nm. In another example, the light source produces some light emissions in the range of about 180 nm to about 400 nm. In yet another example, the light source is a light source with high optical output that produces some light emissions of about 300 nm.

The photo-Fenton reaction may also include a pH-modifying substance so as to adjust the pH of the reaction mixture. Example pH-modifying substances include, but are not limited to sodium hydroxide and sulfuric acid. In one exemplary aspect, addition of a pH-modifying substance may serve to accelerate the reaction kinetics. In one example, the pH of the reaction mixture is about 1 and about 7. In another example, the pH of the reaction mixture is about 3 and about 6. In yet another example, the pH of the reaction mixture is about 4.3.

The reaction conditions for a photo-Fenton reaction are one of the many advantages over prior art attempts to decarboxylate fatty acids. For example, the photo-Fenton reaction can occur at temperature from about 5° Celsius to about 100° Celsius. In another example, the photo-Fenton reaction can occur at temperature from about 5° Celsius to about 80° Celsius. In yet another example, the photo-Fenton reaction occurs at a temperature from about 10° Celsius to about 50° Celsius. In still another example, the photo-Fenton reaction occurs at a temperature from about 16° Celsius to about 44° Celsius. In still yet another example, the photo-Fenton reaction occurs at about 22° Celsius. The photo-Fenton reaction may also occur at a room temperature.

Similarly, reaction pressures may vary according to desired reaction kinetics. In an example, the reaction is carried out at a pressure of about 14 psi to about 30 psi. In another example, the reaction is carried out at a pressure of about 14 psi to about 20 psi. In yet another example, the reaction is carried out at a pressure of about 14.7 psi. In still yet another example, the reaction is carried out at atmospheric pressure.

At step 112, selective, radical-initiated decarboxylation of the carboxylic acid is achieved by contacting the end-group of the carboxylic acid with the oxidants produced in step 108 at a water/oil interface. As shown below in Reaction 3, in the exemplary implementation carboxylic acid (right) aligns itself so that a carboxylic portion of the carboxylic acid (left most portion of right molecule) is nearest the water/oil interface (illustrated by the dotted line) and the fat-soluble "tail," which may be an olefin or paraffin, is oriented away from this interface into the oil layer.

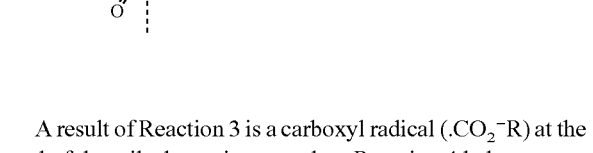

{Reaction 3}

A result of Reaction 3 is a carboxyl radical (.$CO_2^-R$) at the end of the tail, shown in exemplary Reaction 4 below.

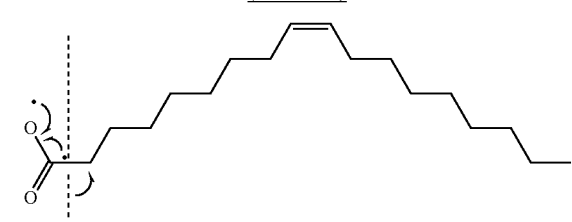

{Reaction 4}

As shown in Reaction 5, loss of carbon dioxide results in the formation of an alkyl radical.

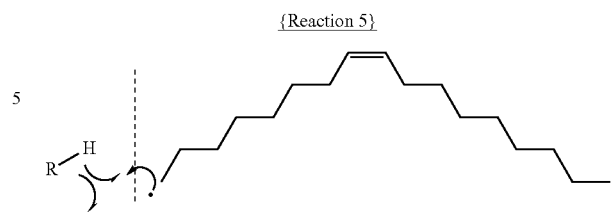

{Reaction 5}

Also shown in Reaction 5 is the contacting of an alkyl radical with a group containing a hydrogen residing in the oil or water layer. This results in a decarboxylated product (shown in Reaction 6 below). In one exemplary aspect, decarboxylated product may have lower water solubility than its parent molecule, which can cause the product to diffuse away from the water/oil interface into the bulk oil.

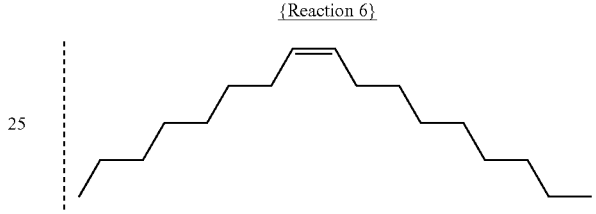

{Reaction 6}

The diffusion of the decarboxylated product drives the reaction system forward as the water/oil interface is replenished at Reaction 7 with the more hydrophilic fatty acid feedstock for subsequent decarboxylation.

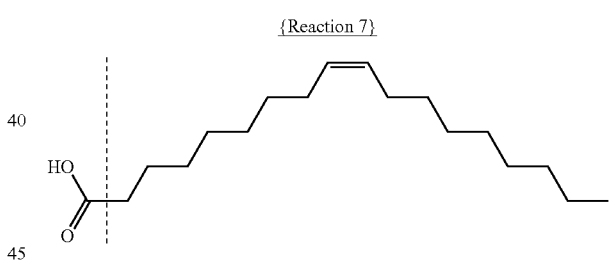

{Reaction 7}

Experimental results monitoring the carbonyl stretch (C=O), conducted on several examples in the laboratory, using attenuated total reflectance infrared spectroscopy (ATR-FTIR) show decarboxylation of oleic acid, a model eighteen-carbon fatty acid, through the disappearance of this strong absorption feature. Decarboxylation of oleic acid was also seen using 1H nuclear magnetic resonance spectroscopy tests. Tests showed selective decarboxylation of the carboxylic acid end-group on the free fatty acid by indicating a decrease in the $CH_2$ triplet by 2.23 ppm, a significant decrease from the alkene peak of 5.48 ppm. Possible side reactions may include the formation of hydroxyl, peroxyl, hydroperoxyl, as well as other oxygenated organic functional groups on the decarboxylated products.

After achieving the decarboxylated product, at step 116 a dehydration reaction may be used for these oxygenated organic byproducts resulting from process 100, which may further improve the overall properties (e.g., cloud point) of the oxygenated organic byproducts. Increased temperatures may also be used to promote dehydration. The oxygenated organic products can also be deoxygenated, for example, by acid-catalyzed dehydration to yield an olefinic or paraffinic hydrocarbon. Notably, in contrast to typical petrochemical refining processes, such as hydrocracking, no aromatic hydrocarbons result from process 100. Aromatic hydrocarbons have been linked to detrimental environmental and health effects. Additionally, the reaction of process 100 should not result in polymers. Tests conducted on example products produced using a process according to the current disclosure (e.g., process 100) using electrospray ionization mass spectrometry and atmospheric ionization mass spectrometry did not reveal repeating high mass units, which indicate polymerization.

Subsequent processing may include typical petrochemical refinery practices because the decarboxylated product resulting from process 100 resembles straight-chain hydrocarbons derived from petroleum. A petrochemical refinery may create fuels or other carbon products with the appropriate carbon lengths that can be used in a variety of engines or for other applications.

Figure 2:
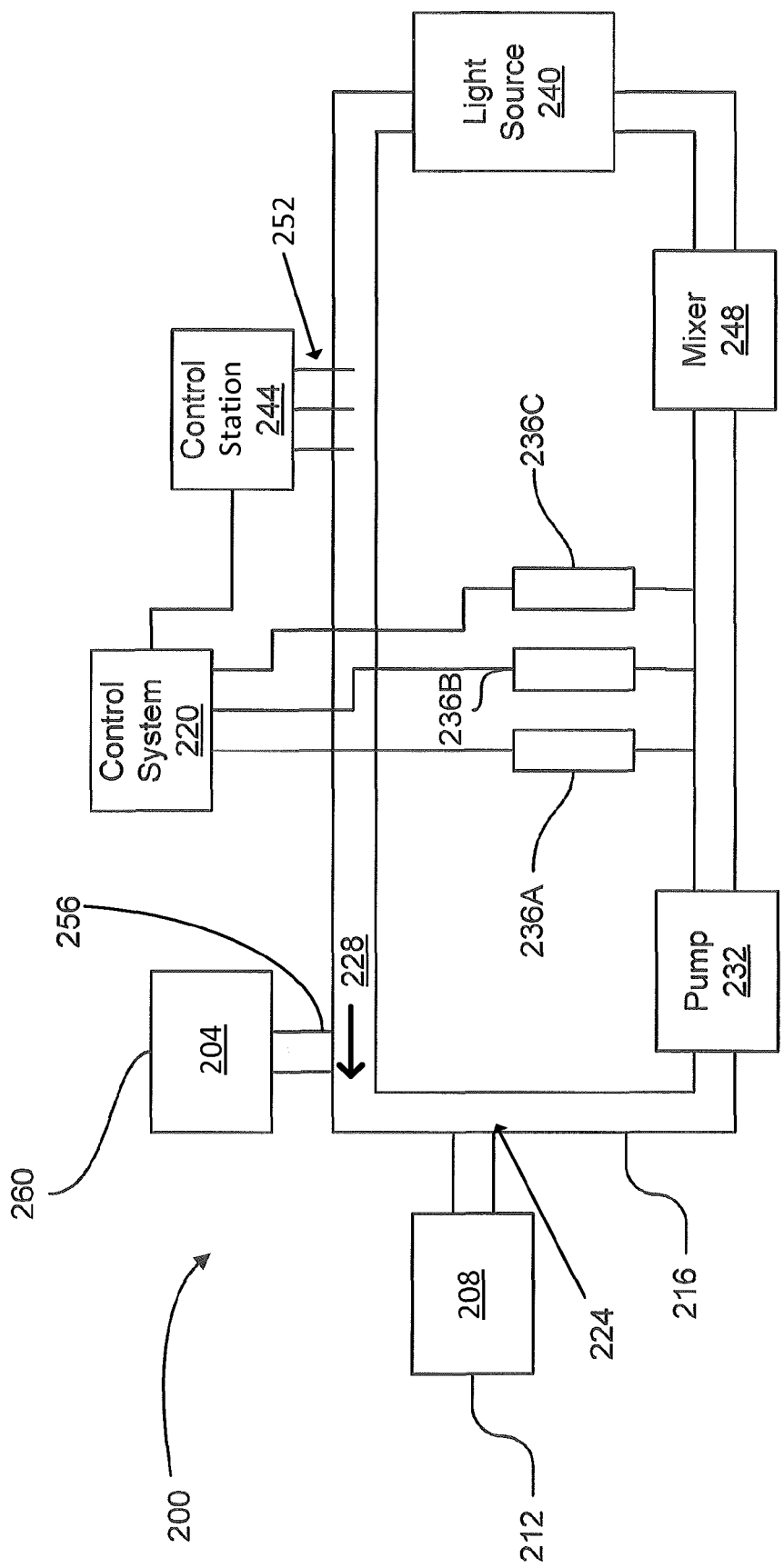
FIG. 2 is a schematic diagram of a reactor suitable for decarboxylating alkyl-esters according to an embodiment of the present invention.

FIG. 2 shows an exemplary photo-Fenton reactor 200. At high level, reactor 200 is suitable for carrying out chemical reaction, similar to process 100 described above, and as such the reactor provides the conditions necessary to produce oxidants and to contact the oxidants with the fatty acids at a water/oil interface. As will be discussed more fully below, reactor 200 produces a decarboxylated product 204, typically an olefin or paraffin, along with oxygenated organic byproducts from a fatty acid feedstock 208 using a photo-Fenton reaction system, without producing aromatic compounds. Reactor 200 also allows for selective contacting between oxidants and the fatty acids at a water/oil interface, thus improving the conversion of fatty acid feedstock 208 to decarboxylated product 204. In addition, reactor 200 may be operated at room temperature and pressure, thus reducing the energy necessary to produce decarboxylated product 204.

Reactor 200 can include an input device 212 having a supply of fatty acid feedstock 208. Input device 212 facilitates the transfer of fatty acid feedstock 208 to a reactor pathway 216. In one example, the supply of fatty acid feedstock 208 may be metered at, or after, input device 212, and may be controlled by a control system 220. In an alternative example, input device 212 may not be included with reactor 200. In one such example, fatty acid feedstock 208 is input into reactor 200 at or near location 224 prior to the start-up of the reactor.

Reactor pathway 216 contains a mixture 228 of aqueous solution, fatty acid feedstock 208, and, in some embodiments, decarboxylated product 204. As shown in FIG. 2, mixture 228 is flowing in the counterclockwise direction, and therefore fatty acid feedstock 208, once input into reactor pathway 216, is input to a pump 232. Pump 232 provides for liquid movement in reactor pathway 216 by drawing in mixture 228 and propelling the mixture toward one or more reagent inputs 236, a light source 240, and a control station 244.

Reagent inputs 236, shown in FIG. 2 as reagent inputs 236A-C, provide reagents used in reactor 200. As mentioned above with respect to process 100, the concentrations of the reagents used in the reaction are maintained within certain concentration levels in order to maintain the reaction kinetics of the photo-Fenton reaction as well as to avoid problems associated with excessive amounts of reagents. To that end, reagent inputs 236A-C are each connected to control system 220, which monitors the concentration of the reagents at control station 244 and adjusts the output of the reagent inputs in order to meet a predetermined reaction concentration. Control of the input of reagents residing in reagent inputs 236A-C into reactor 200 may be aided by the use of syringe pumps, but it is understood that other types of pumps or input devices may be used that allow for precise quantities of reagents to be input into the reactor.

In an exemplary embodiment, reagent input 236A contains a Fenton metal catalyst, such as Iron (Fe), Copper (Cu), Vanadium (V), Manganese (Mn), and/or Titanium (Ti). As would be readily understood by a person of ordinary skill in the art, the Fenton metal catalyst may be, but are not typically available (or stable) without an additional group and therefore originate as salts. For example, iron bromide, iron iodide, iron chloride, or iron sulfate may be used as the Fenton metal catalyst in Reaction 2 and thus supply the Fe (II) metal catalyst, above. In this embodiment, reagent input 236B contains hydrogen peroxide and reagent input 236C contains a pH-modifying substance, such as sulfuric acid.

A mixer 248 may also be included with reactor 200. Mixer 248 is capable of agitating the mixture traveling in reaction pathway 216 so as to increase the possibility of oxidants contacting the fatty acid feedstock 208 by increasing the surface area of the water/oil interface. Water/oil interface occurs, as shown for example in Reaction 3 above, by the coalescence of a certain quantity of fatty acid feedstock 208, which repels the aqueous solution residing within reactor 200. Mixer 248 contributes to increasing the surface area of the water/oil interface existing within mixture 228 by dispersing some of the coalesced fatty acid feedstock 208.

Reactor 200 also includes a light source 240 that accelerates the reaction kinetics of the photo-Fenton reaction occurring in reactor 200. In one example, light source 240 is designed and configured so that the light wavelengths emanating from the light source are generally uniform along the longitudinal length of the light source. This style of light source 240 enables a design of reactor pathway 216 that encircles light source 240, which increases the duration that the mixture is exposed to the light wavelengths. In another example, reactor pathway 216 may be wound or woven back and forth along a single plane so that light source 240 may be designed and configured to have all of the light wavelengths directed toward the reaction pathway. Reaction pathway 216 may be composed of a different material while in the presence of the light source than it would be elsewhere in the system. For instance, reaction pathway 216 may be made with quartz to facilitate the absorption of light by the reagents, while elsewhere the reaction pathway may be made of materials suitable for use with neutral to highly acidic conditions.

The capabilities and types of light source 240 that are suitable for reactor 200 have been previously described above with reference to process 100. In one example, light source 240 is capable of producing light at some wavelengths between about 100 nm to about 800 nm. In one such example, light source 240 produces light at least a wavelength of about 300 nm. In alternative implementations, light source 240 may be substituted, or used in conjunction, with devices capable of producing heat, microwave, ultrasound, electrochemical conditions, or combinations thereof.

As shown in FIG. 2, the pH, concentration of hydrogen peroxide, and Fenton metal catalyst, may be monitored and controlled using control station 244. Control station 244 is connected to control system 220 and is configured to provide information regarding the composition and chemistry of mixture 228. Control station 244 may include one or more sensors 252, such as, but not limited to, a pH sensor, an aqueous iron sensor, a hydrogen peroxide sensor, and/or a temperature sensor. In one example, control station 244 is positioned after light source 240. Other locations for the monitoring of various conditions of mixture 228 would be readily apparent to those of ordinary skill in the art. In another example, control system 244 may include devices for altering the conditions of the mixture 228, such as, but not limited to, chillers or heat exchangers for altering the mixture temperature.

Output 256 assists in the removal of decarboxylated product 204 from mixture 228. Output 256 may lead to a vessel 260 for the storage of decarboxylated product 204. Alternatively, reactor 200 may not include an output 256, instead decarboxylated product 204 is removed from the reactor after a predetermined amount of time or after control system 220 indicates that the reaction has reached a certain amount of conversion or completion.

It is to be noted that any one or more of the aspects and embodiments of control system 220 described herein may be conveniently implemented using one or more machines (e.g., one or more computing devices that are utilized as a user computing device for an electronic document, one or more server devices, such as a document server). In one example, control system 220 can control the delivery of reagents and the reaction conditions of the process, such as process 100, through the use of, for instance, sensors for sensing certain conditions (e.g., control station 240) and input devices for adding substances to the mixture (e.g., syringe pumps for reagent inputs 236). In another example, control system 220, when implemented as a machine, can include a processor and a memory that communicate with each other, and with other components, such as control station 240 or reagent inputs 236. In yet another example, control system 220 may also include a user interface.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of selectively decarboxylating a fatty acid comprising:
    providing a fatty acid feedstock and an aqueous solution of hydrogen peroxide, wherein the fatty acid feedstock comprises fatty acids having a carboxyl group;
    generating a water soluble oxidant by a photo-Fenton reaction of the hydrogen peroxide in the presence of light;
    contacting the water soluble oxidant with the fatty acid, wherein the fatty acids are selectively decarboxylated by the water soluble oxidant to remove the carboxyl group from the fatty acid and a selectively decarboxylated product is produced, wherein the selectively decarboxylated product is a hydrocarbon corresponding to the non-carboxyl group portion of the fatty acids; and
    isolating the selectively decarboxylated product,
    wherein a water/oil interface is formed between the water soluble oxidant and the fatty acid feedstock, and wherein the fatty acids in the fatty acid feedstock are oriented such that the carboxyl groups of the fatty acids at the water/oil interface prevent contact between the oxidant and non-carboxyl groups of the fatty acid feedstock.

2. The method according to claim 1, wherein the photo-Fenton reaction occurs in the presence of a Fenton metal catalyst, wherein the Fenton metal catalyst comprises a transition metal from the fourth period of the periodic table.

3. The method according to claim 2, wherein the Fenton metal catalyst is selected from the group consisting of Copper, Titanium, Iron, Vanadium and Manganese.

4. The method according to claim 2, wherein a concentration of the Fenton metal catalyst is about $1 \times 10^{-6}$ wt % to about 1 wt %.

5. The method according to claim 2, wherein a concentration of the Fenton metal catalyst is about $8 \times 10^{-3}$ wt % to about $4.6 \times 10^{-3}$ wt %.

6. The method according to claim 2, wherein a concentration of the Fenton metal catalyst is about $4 \times 10^{-4}$ wt %.

7. The method according to claim 1, wherein the photo-Fenton reaction is carried out in the presence of ferrous iron.

8. The method according to claim 1, wherein the photo-Fenton reaction is carried out in the presence of cupric ions.

9. The method according to claim 1, wherein the photo-Fenton reaction is carried out in the presence of titanium.

10. The method according to claim 1, wherein the aqueous solution of hydrogen peroxide has a concentration of hydrogen peroxide of about $1 \times 10^{-6}$ wt % to about 5 wt %.

11. The method according to claim 1, wherein the aqueous solution of hydrogen peroxide has a concentration of hydrogen peroxide of about $8 \times 10^{-4}$ wt % to about 1 wt %.

12. The method according to claim 1, wherein the aqueous solution of hydrogen peroxide has a concentration of hydrogen peroxide of about 1 wt %.

13. The method according to claim 1, wherein the photo-Fenton reaction occurs at a pH of about 1 to about 7.

14. The method according to claim 1, wherein the photo-Fenton reaction occurs at a pH of about 3 to about 6.

15. The method according to claim 1, wherein the photo-Fenton reaction occurs at a pH of about 4.3.

16. The method according to claim 1, wherein the photo-Fenton reaction occurs at about 10 to about 50 degrees Celsius.

17. The method according to claim 1, wherein the photo-Fenton reaction occurs at about 16 to about 44 degrees Celsius.

18. The method according to claim 1, wherein the photo-Fenton reaction occurs at room temperature.

19. The method according to claim 1, wherein the photo-Fenton reaction occurs at about 14 to about 30 psi.

20. The method according to claim 1, wherein the photo-Fenton reaction occurs at about 14 to about 20 psi.

21. The method according to claim 1, wherein the photo-Fenton reaction occurs at about atmospheric pressure.

22. The method according to claim 1, wherein said generating is accomplished by a hydrogen peroxide/UV light system.

23. The method according to claim 22, wherein the aqueous solution of hydrogen peroxide has a concentration of hydrogen peroxide of about $1 \times 10^{-6}$ wt % to about 5 wt %.

24. The method according to claim 22, wherein the aqueous solution of hydrogen peroxide has a concentration of hydrogen peroxide of about $8 \times 10^{-4}$ wt % to about 1 wt %.

25. The method according to claim 22, wherein the aqueous solution of hydrogen peroxide has a concentration of hydrogen peroxide of about 1 wt %.

26. The method according to claim 22, wherein the UV light system generates a wavelength between about 100 nm and about 800 nm.

27. The method according to claim 22, wherein the UV light system generates a wavelength between about 180 nm and about 400 nm.

28. The method according to claim 22, wherein the UV light system generates a wavelength of about 300 nm.

29. The method according to claim 1, wherein the selective decarboxylation does not result in the formation of aromatic hydrocarbon molecules.

30. The method according to claim 1, wherein the non-carboxyl group portion is an olefin or paraffin portion.

31. The method according to claim 30, further comprising separating the paraffin and/or olefin portion from the fatty acid feedstock.

32. The method according to claim 31, further comprising dehydrating the paraffin and/or olefin portion.

* * * * *